(12) United States Patent
Fujisawa et al.

(10) Patent No.: US 8,267,529 B2
(45) Date of Patent: Sep. 18, 2012

(54) OPTICAL DEVICE HAVING REFLECTING MEMBER ATTACHED TO HOUSING AND PROJECTOR HAVING OPTICAL DEVICE

(75) Inventors: Shohei Fujisawa, Matsumoto (JP);
Hidetoshi Hashizume, Azumino (JP);
Toshihiro Hieda, Matsumoto (JP);
Kazuyuki Iinuma, Azumino (JP)

(73) Assignee: Seiko Epson Corporation, Tokyo (JP)

(*) Notice: Subject to any disclaimer, the term of this patent is extended or adjusted under 35 U.S.C. 154(b) by 321 days.

(21) Appl. No.: 12/706,281

(22) Filed: Feb. 16, 2010

(65) Prior Publication Data
US 2010/0208218 A1 Aug. 19, 2010

(51) Int. Cl.
*G03B 21/28* (2006.01)
*G03B 21/22* (2006.01)
(52) U.S. Cl. .......................... 353/98; 353/119
(58) Field of Classification Search ............. 362/296.01, 362/296.09; 353/98, 119, 37, 50, 51, 77, 353/78, 99; 359/871–875, 881, 882, 838; 248/466, 475.1, 476, 477; 352/242, 243
See application file for complete search history.

(56) References Cited

U.S. PATENT DOCUMENTS
7,222,976 B2   5/2007 Kitabayashi et al.
2006/0050253 A1* 3/2006 Iinuma et al. ................. 353/119

FOREIGN PATENT DOCUMENTS
JP   A-2005-202148   7/2005

* cited by examiner

*Primary Examiner* — Pascal M Bui Pho
(74) *Attorney, Agent, or Firm* — Oliff & Berridge, PLC

(57) ABSTRACT

An optical device includes: a housing; and a reflection member disposed at a predetermined position within the housing, the housing includes a receiving opening through which the reflection member is inserted to be accommodated in the housing, and an attachment unit to which the reflection member is attached, the reflection member includes a front portion which has a reflection area for reflecting supplied light, a back portion positioned on the side opposite to the front portion, and a fixing unit positioned within the surface of the back portion and fixed to the attachment unit, and the fixing unit has an opening into which a position control jig inserted in an attachment direction of attaching the reflection member to the attachment unit through the receiving opening is inserted.

4 Claims, 11 Drawing Sheets

OPTICAL DEVICE HAVING REFLECTING MEMBER ATTACHED TO HOUSING AND PROJECTOR HAVING OPTICAL DEVICE

The entire disclosure of Japanese Patent Application No. 2009-032173, filed Feb. 16, 2009, is expressly incorporated by reference herein.

BACKGROUND

1. Technical Field

The present invention relates to an optical device and a projector including the optical device.

2. Related Art

A projector which includes a light source, a light modulation device for modulating light emitted from the light source to form image light corresponding to image information, and a projection device for expanding and projecting the image light thus formed on a projection surface such as a screen is known. This type of projector further includes an optical device which has a lens unit for equalizing the amount of light emitted from the light source within a transmission area of the lens unit, a plurality of optical components such as a reflection member for changing the optical path of the light, and an optical component housing for accommodating the plural optical components. The respective optical components are disposed at predetermined positions on an illumination optical axis set inside the optical component housing.

Among these optical components, the reflection member for changing the optical path of the entering light needs to be appropriately positioned with respect to the optical component housing. More specifically, when the reflection member is not disposed at a proper position corresponding to the designed position, the reflection member cannot reflect the entering light toward an appropriate position. In this case, the efficiency of using the light emitted from the light source may be lowered, or the formed image light may be deteriorated. For overcoming this problem, such a structure is known which includes a posture control lever disposed on the back side of a reflection mirror (the side opposite to the light entering side) as the reflection member to control the position of the reflection mirror by operating the lever (for example, see JP-A-2005-202148).

The reflection mirror included in the structure shown in JP-A-2005-202148 is attached to a reflection mirror attachment unit provided on a component receiving member constituting an optical component housing in such a condition as to be urged toward the attachment unit by an urging member. An opening which is formed on the component receiving member and through which optical components are inserted is closed by a cover member which similarly constitutes the optical component housing. In this structure, the position of the reflection mirror is controlled by operating the lever projecting through an opening of the cover member.

According to the projector disclosed in JP-A-2005-202148, the lever projects to the outside of the optical component housing. In this case, the optical component housing containing the reflection mirror becomes large. Particularly when a control board disposed inside the projector to control the overall operation of the projector is provided in such a manner as to cover the optical device having the optical component housing, the increase in the size of the optical device has a significant effect on the overall size of the projector. Thus, an optical device having a reduced size has been demanded.

SUMMARY

It is an advantage of some aspects of the invention to provide an optical device and a projector capable of achieving size reduction.

An optical device according to an aspect of the invention includes a housing, and a reflection member disposed at a predetermined position within the housing. The housing includes: a receiving opening through which the reflection member is inserted to be accommodated in the housing; and an attachment unit to which the reflection member is attached. The reflection member includes: a front portion which has a reflection area for reflecting supplied light; a back portion positioned on the side opposite to the front portion; and a fixing unit positioned within the surface of the back portion and fixed to the attachment unit. The fixing unit has an opening into which a position control jig inserted in an attachment direction of attaching the reflection member to the attachment unit through the receiving opening is inserted.

According to this structure, the fixing unit of the reflection member fixed to the attachment unit provided in the housing is positioned within the surface of the back portion. In this case, no part of the reflection member projects to the outside of the reflection member viewed from the light entering side. Thus, when the reflection member is attached to the housing, such a component as the lever included in the structure shown in JP-A-2005-202148 does not protrude to the outside of the housing. Accordingly, the optical device can be made compact.

Moreover, the fixing unit has the opening into which the jig is inserted in the attachment direction of attaching the reflection member to the attachment unit through the receiving opening. In this case, the jig can easily engage with the reflection member. Accordingly, the reflection member and the jig can easily engage with each other and disengage from each other, thereby facilitating the position control of the reflection member.

It is preferable that the fixing unit includes a substantially cylindrical pin extending in the attachment direction, and a contact portion contacting the attachment unit. In this case, the attachment unit includes a hole through which the pin is inserted, and a support portion which contacts the contact portion and supports the fixing unit.

According to this structure, the position of the reflection member is controlled by rotating the reflection member around the center axis of the pin inserted through the hole. At the time of the position control, the fixing unit and thus the reflection member are supported by the support portion. In this case, the jig for controlling the position of the reflection member is not required to hold the reflection member. Thus, the position of the reflection member can be easily controlled, and the structure of the jig can be simplified.

It is preferable that one of parts of the contact portion and the support portion opposed to each other has a curved surface centered on a line extending in a direction of inserting the pin through the hole and expanding toward the other part. In this case, the other of the parts of the contact portion and the support portion opposed to each other has a flat surface substantially orthogonal to the attachment direction. Also, a predetermined clearance allowing rotation of the reflection member with the fulcrum of the rotation of the reflection member located at the contacting area between the curved surface and the flat surface is provided between the edge of the hole and the pin inserted through the hole.

According to this structure, one of the contact portion and the support portion has the curved surface, and the other has the flat surface. In this case, the position of the reflection member can be controlled by inclining the reflection member in the direction in which the one portion follows the other portion (the rotation direction around the center axis orthogonal to the center axis of the pin as the guiding direction) with the fulcrum located at the contacting area between the contact portion and the support portion. Since the predetermined clearance is provided between the pin and the edge of the hole, the position control of the reflection member is not interrupted. Thus, the position control direction of the reflection member can be further varied such that the reflection member can be disposed at a more appropriate position.

It is preferable that the contact portion is formed at the base end of the pin. In this case, the cross point of the center axis of the pin and the center axis of the reflection member inclined with the fulcrum of the inclination of the reflection member located at the contacting area is positioned almost on an extension line from the optical axis of the light supplied to the reflection member when the reflection member is accommodated in the housing.

According to this structure, the displacements at both ends of an area for receiving light (light receiving area) on the front portion can be made substantially equal at the time of the position control of the reflection member.

More specifically, at the time of rotation of the reflection member around the center axis of the pin, the displacements at both the ends of the light receiving area in the direction orthogonal to the center axis of the pin can be made substantially equal under the condition in which a point on the center axis of the pin is positioned on the extension line from the optical axis of the supplied light.

Also, at the time of inclination of the reflection member with the fulcrum of the inclination located at the contacting area between the contact portion and the support portion, the displacements at both the ends of the light receiving area in the direction orthogonal to the center axis of the inclination of the reflection member, that is, the displacements at both the ends in the direction of the center axis of the pin can be made substantially equal under the condition in which the center axis of the inclination of the reflection member is positioned on the extension line from the optical axis of the supplied light.

Thus, the displacements at both the ends of the light receiving area can be made substantially equal at the time of the position control of the reflection member. Accordingly, the position of the reflection member can be adequately controlled.

It is preferable that the fixing unit contains a pair of contact surfaces each of which forms the edge of the opening and contacts the jig. In this case, at least one of the pair of the contact surfaces is an inclined surface approaching the other surface in the insertion direction of the jig.

According to this structure, the jig contacts the pair of the contact surfaces forming the edge of the opening. In this case, at least one of the pair of the contact surfaces is an inclined surface approaching the other surface in the insertion direction of the jig. Thus, the jig inserted into the opening and the contact surfaces can securely engage with each other. Moreover, the jig can easily give a load to the fixing unit in the insertion direction of the jig (i.e., the attachment direction of the reflection member to the attachment unit) for preventing swing of the fixing unit in the attachment unit. Furthermore, the jig can be easily removed from the opening after the position control of the reflection member. Accordingly, the position control of the reflection member can be further easily performed.

A projector according to another aspect of the invention includes the optical device described above.

According to this structure, advantages similar to those of the optical device can be offered, and size reduction of the projector can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENT

An embodiment of the invention is hereinafter described with reference to the drawings.

Structure of Projector

Figure 1:
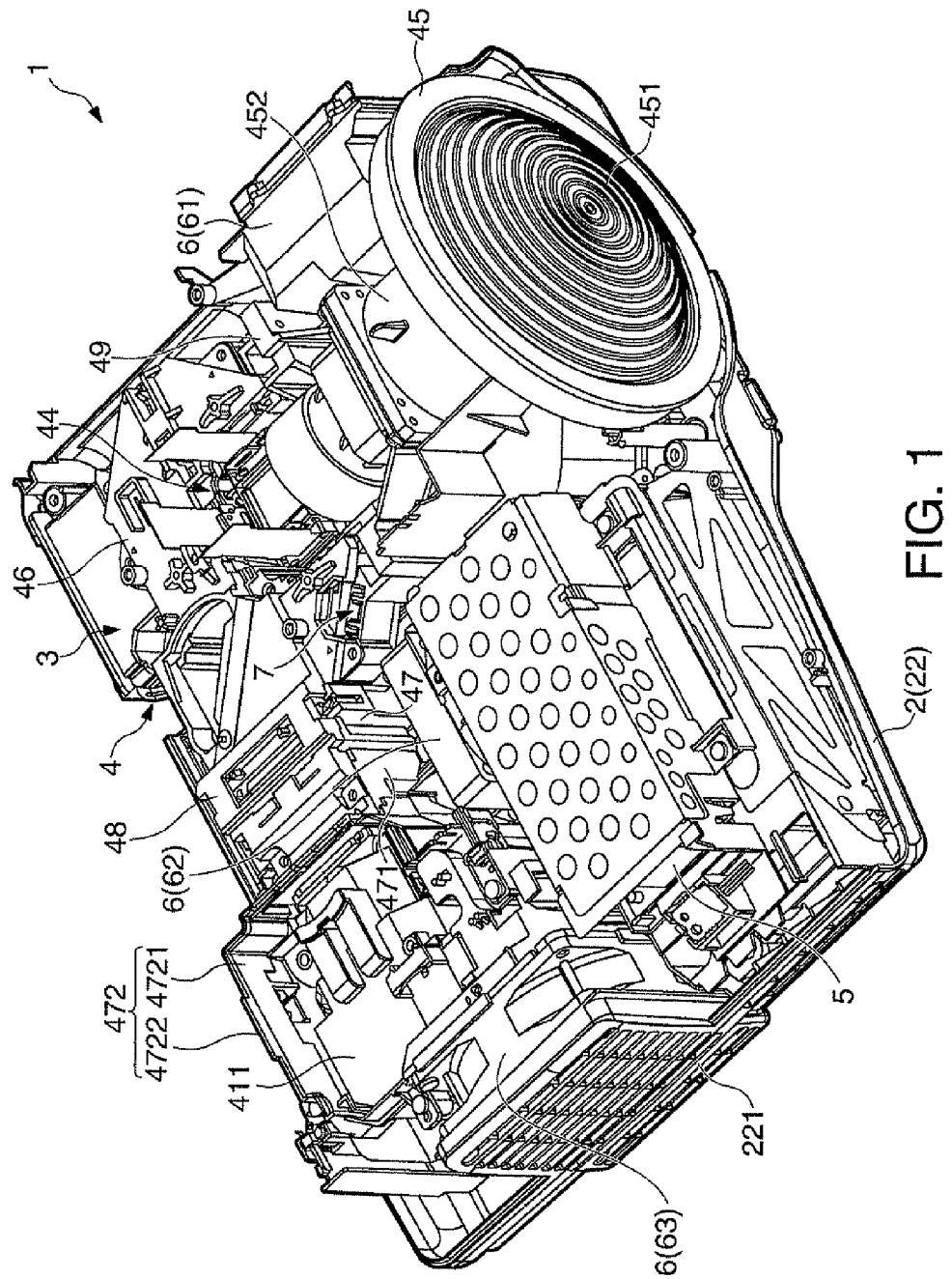
FIG. 1 is a perspective view of a projector according to an embodiment of the invention.

FIG. 1 is a perspective view of a projector according to this embodiment as viewed from the front.

The projector 1 in this embodiment forms image light corresponding to image information received from an external device or the like, and projects the image light on a projection surface such as a screen. As illustrated in FIG. 1, the projector 1 includes an external housing 2 and a device main body 3 accommodated in the external housing 2.

The external housing 2 is a case member made of synthetic resin and having a substantially parallelepiped shape as a whole. The external housing 2 has an upper case (not shown) forming the upper part, a lower case 22 forming the lower part, and a front case (not shown) forming the front part (the part on the side where the image light is projected from a projection unit 45 described later).

Structure of Device Main Body

The device main body 3 as a unit for processing the image information and forming and projecting image light corresponding to the image information is fixed to the lower case 22. The device main body 3 has an optical device 4, a power source device 5, a cooling device 6, and a control device (not shown).

The power source device 5 is disposed on the front part side of the projector 1. The power source device 5 converts commercial alternating current inputted from the outside into direct current, and supplies the direct current to the respective electronic components included in the projector 1 by boosting and reducing voltage.

The cooling device 6 has a plurality of fans (such as fans 62 and 63) and a plurality of ducts (such as a duct 61). The cooling device 6 introduces outside air through an intake port (not shown) formed on the external housing 2 by using the fans rotating under the control of the control device, and cools the optical device 4, the power source device 5, the control device and the like by using the introduced air. The cooling device 6 discharges the air having cooled the respective devices to the outside through a discharge port 221 formed on the lower case 22.

The control device controls the operation of the projector 1. For example, the control device performs processes corresponding to input operations inputted through keys (not shown) provided on the external housing 2, and processes inputted image information to output drive signals corresponding to the image information to the optical device 4. Though not shown in detail, the control device is a circuit board on which CPU (central processing unit) and the like are mounted, and is disposed above the optical device 4.

Structure of Optical Device

Figure 2:
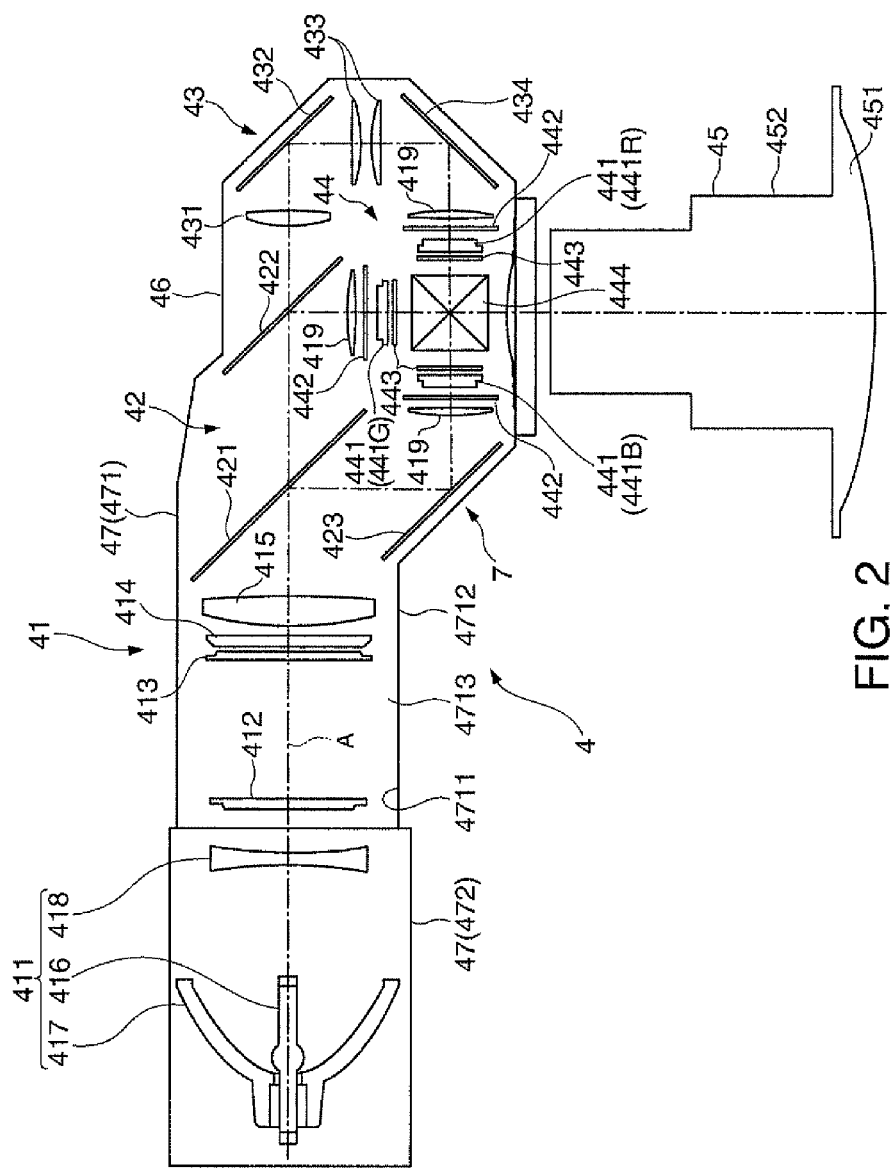
FIG. 2 schematically illustrates a structure of an optical device according to the embodiment.

FIG. 2 schematically illustrates the structure of the optical device 4.

The optical device 4 forms image light corresponding to the drive signals inputted from the control device, and projects the image light on the projection surface. The optical device 4 has a substantially L shape in the plan view extending along the back surface of the external housing 2 and extending along the side surface of the external housing 2.

As illustrated in FIG. 2, the optical device 4 has an illumination optical unit 41, a color separation optical unit 42, a relay optical unit 43, an electro-optic unit 44, the projection optical unit 45, and an optical component housing 46 for accommodating and positioning the respective optical units 41 through 45 on an illumination optical axis A set inside the optical component housing 46.

The illumination optical unit 41 has a light source 411, lens arrays 412 and 413, a polarization conversion element 414, and a superimposing lens 415.

The light source 411 has a discharge-type light source lamp 416 constituted by an extra-high pressure mercury lamp or the like, a reflector 417 for reflecting light emitted from the light source lamp 416 and converging the light at a predetermined position, and a collimating concave lens 418 for collimating light converged by the reflector 417 with respect to the illumination optical axis A. It is possible to employ a solid light source such as LED (light emitting diode) in place of the light source lamp 416.

Each of the lens arrays 412 and 413 has small lenses disposed in matrix at positions corresponding to those of the other lens array. The lens array 412 divides light emitted from the light source 411 into a plurality of partial lights and forms images of the lights in the vicinity of the lens array 413. The lens array 413 forms the images released from the respective small lenses of the lens array 412 on image forming areas of liquid crystal panels 441 described later in cooperation with the superimposing lens 415 disposed downstream on the optical path.

The polarization conversion element 414 converts the respective partial lights received from the lens array 413 into one type of linear polarized lights.

The color separation optical unit 42 has two dichroic mirrors 421 and 422 and a reflection member 423 as a unit for separating the plural partial lights emitted from the illumination optical unit 41 into three color lights in red (R), green (G), and blue (B). The green light and blue light of these color lights enter entrance side polarization plates 442 for green and blue lights via converging lenses 419, and the red light enters the entrance side polarization plate 442 for red light via the relay optical unit 43 and the converging lens 419. The structure of the reflection member 423 and the attachment of the reflection member 423 to the optical component housing 46 will be described in detail later.

The relay optical unit 43 as a unit for allowing the red light whose optical path is longer than those of the other color lights to be used without decrease in the use efficiency supplies the red light to the entrance side polarization plate 442 for red light. The relay optical unit 43 has an entrance lens 431, relay lenses 433, and reflection mirrors 432 and 434. While the red light passes the relay optical unit 43 in this embodiment, the other color lights such as the blue light may pass the relay optical unit 43.

The electro-optic unit 44 modulates entering light and forms image light. The electro-optic unit 44 has the three liquid crystal panels 441 as light modulation units (liquid crystal panel for red light 441R, liquid crystal panel for green light 441G, and liquid crystal panel for blue light 441B), the three entrance side polarization plates 442 each of which is disposed on the light entrance side of the corresponding liquid crystal panel 441, three exit side polarization plates 443 each of which is disposed on the light exit side of the corresponding liquid crystal panel 441, and a cross dichroic prism (hereinafter abbreviated as "prism" in some cases) 444 as a color combining unit. The electro-optic unit 44 is a unit including these components as one body.

The respective entrance side polarization plates 442 transmit only polarized lights having the same polarization direction as the polarization direction equalized by the polarization conversion element 414 among respective color lights separated by the color separation optical unit 42, and absorb the other lights.

Each of the liquid crystal panels 441 has a pair of transparent glass substrates between which liquid crystals as electro-optic substances are sealed, and modulates the polarization direction of the polarized lights released from the entrance side polarization plates 442 by controlling the orientation condition of the liquid crystals according to the drive signals inputted from the control device.

The respective exit side polarization plates 443 transmit polarized lights having a certain direction (such as lights having a polarization axis orthogonal to the light transmission axis of the entrance side polarization plates 442) of the lights released from the liquid crystal panels 441, and absorb the other lights.

The prism 444 forms a color image by combining the lights released from the respective exit side polarization plates 443. The prism 444 has a substantially square shape in the plan view produced by affixing four rectangular prisms. Two dielectric multilayer films are provided on the interfaces between the rectangular prisms affixed to each other. These dielectric multilayer films transmit the color light released from the liquid crystal panel 441G and received via the exit side polarization plate 443, and reflects the color lights released from the liquid crystal panels 441R and 441B and received via the exit side polarization plates 443. By this method, image light as a combination of the red light, green light, and blue light can be formed.

The projection optical unit 45 expands and projects the image light formed by the electro-optic unit 44. The projection optical unit 45 includes a combination lens having a plurality of lenses (such as a Fresnel lens 451 disposed at the leading end in the projection direction) and a lens barrel 452 containing the plural lenses.

The optical component housing 46 is a box-shaped component made of synthetic resin and containing the illumination optical axis A as a designed optical axis on which the respective optical units 41 through 45 are disposed at predetermined positions. As illustrated in FIG. 1, the optical component housing 46 has a receiving opening 4711 through which the respective optical units 41 through 43 are inserted, and further has a component receiving member 47 having a plurality of grooves (not shown) for positioning the respective optical units 41 through 43, a cover member for closing the receiving opening 4711, and a head 49 to which the electro-optic unit 44 and the projection optical unit 45 are attached.

The component receiving member 47 corresponds to a housing according to the invention. The component receiving member 47 has the receiving opening 4711 opening upward, and further has a main section 471 having a substantially concave vertical cross section and containing the respective optical units 41 through 43 except for the light source 411, and a light source receiving section 472 for accommodating the light source 411.

The light source receiving section 472 has a side wall 4721 which surrounds the light source 411 accommodated in the light source receiving section 472, and an opening 4722 which has an edge formed by the side wall 4721 and opens upward. Thus, the light source 411 can be inserted into and removed from the light source receiving section 472 in the vertical direction.

Structure of Attachment Unit

Figure 3:
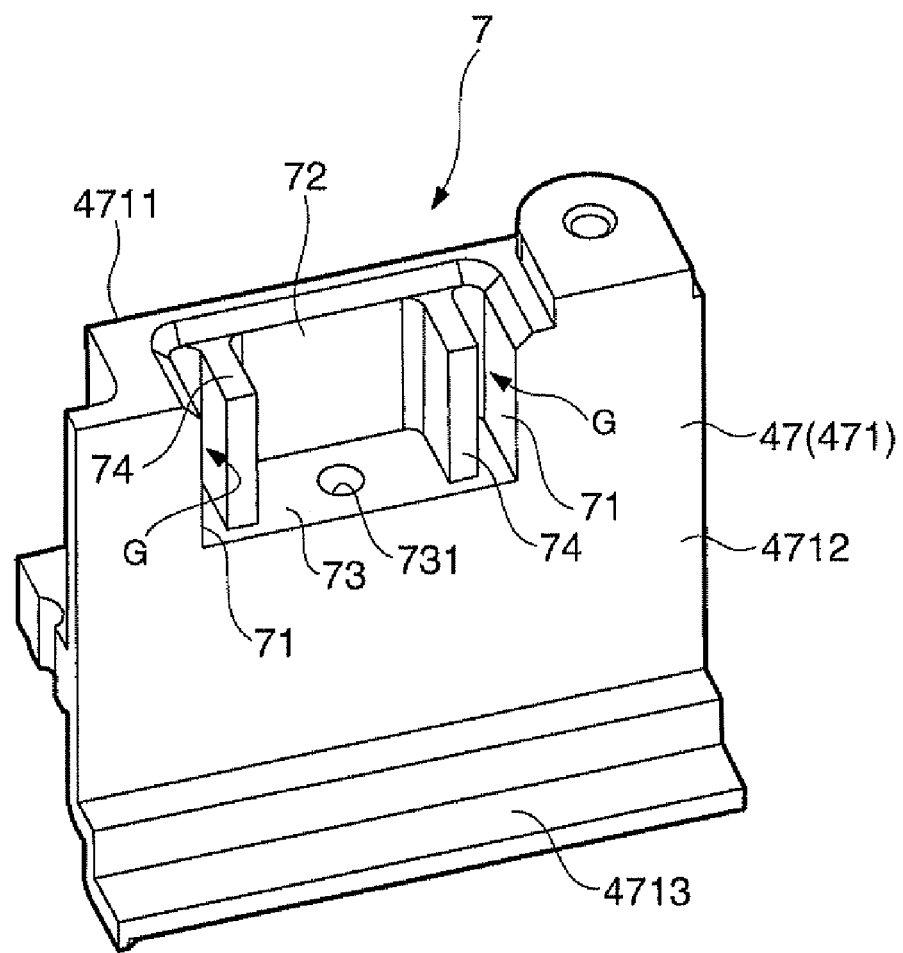
FIG. 3 is a perspective view of an attachment unit according to the embodiment.

FIG. 3 is a perspective view illustrating a part of the main section 471, and more particularly a perspective view of an attachment unit 7 provided on the main section 471.

The main section 471 has the attachment unit 7 to which the reflection member 423 is attached. As illustrated in FIG. 3, the attachment unit 7 has a substantially L-shaped vertical cross section concaved toward the inside of a side wall 4712 forming the edge of the receiving opening 4711. The attachment unit 7 has a pair of side portions 71 opposed to each other, a front portion 72 connecting the ends of the pair of the side portions 71 and extending in the vertical direction (the direction substantially parallel with the side wall 4712 rising from a bottom 4713 of the main section 471), a support portion 73 extending substantially in parallel with the bottom 4713, and a pair of guide portions 74 rising from the support portion 73 to be opposed to the corresponding side portions 71.

The upper surface of the support portion 73 (the surface in the opening direction of the receiving opening 4711) has a flat surface formed as a flat portion, and has a hole 731 substantially at the center of the support portion 73. A pin 814 of a fixing unit 8 (described later) provided on the reflection member 423 is inserted through the hole 731.

The reflection member 423 is attached to the attachment unit 7 having this structure in the direction orthogonal to the opening surface of the receiving opening 4711 from above. Thus, the attachment direction of the reflection member 423 to the attachment unit 7 is the vertical direction when the main section 471 is mounted on a horizontal surface. The attachment and position control of the reflection member 423 with respect to the attachment unit 7 will be described in detail later.

Structure of Reflection Member

Figure 4:
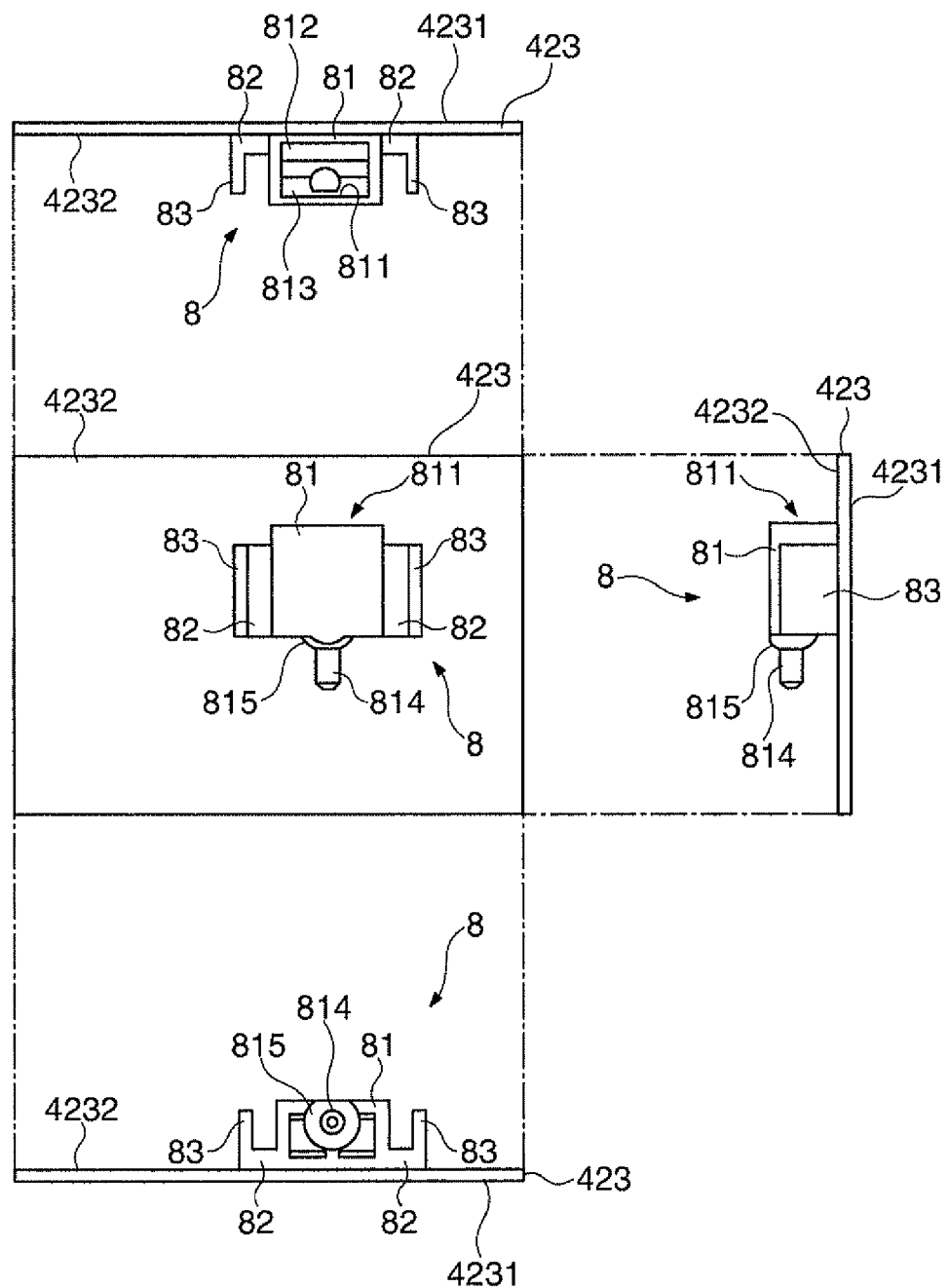
FIG. 4 illustrates a reflection member according to the embodiment.
Figure 5:
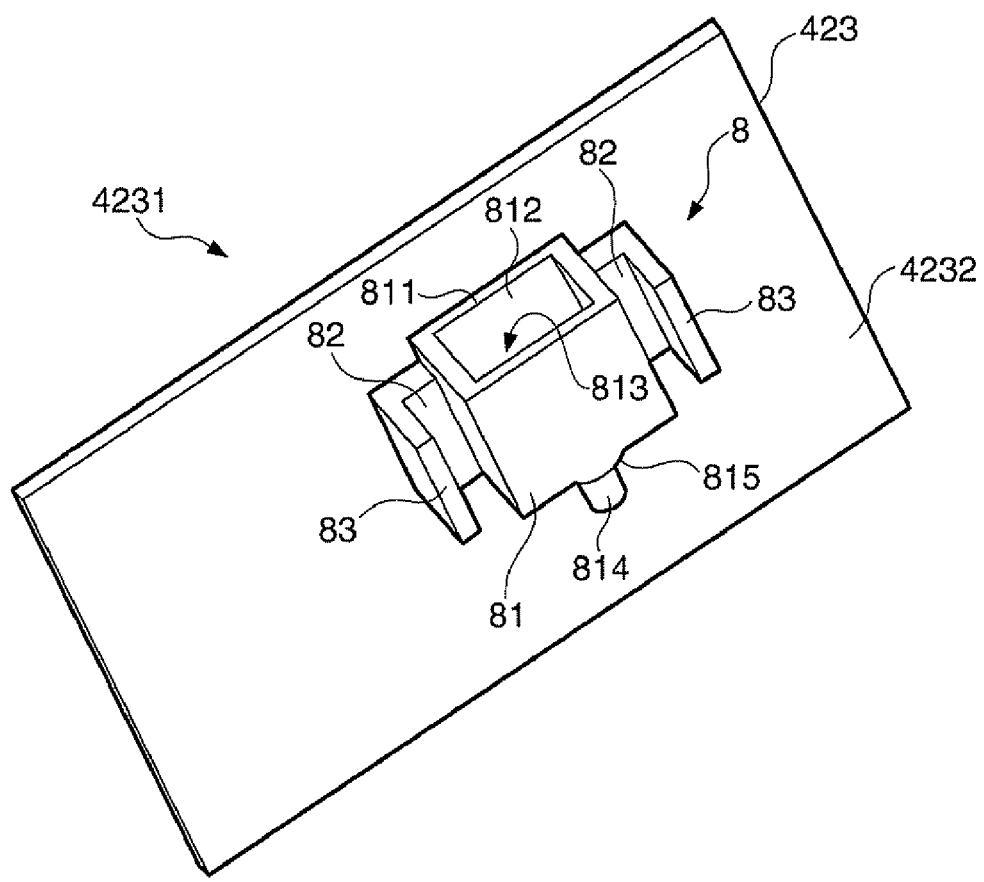
FIG. 5 is a perspective view of the reflection member as viewed from above.
Figure 6:
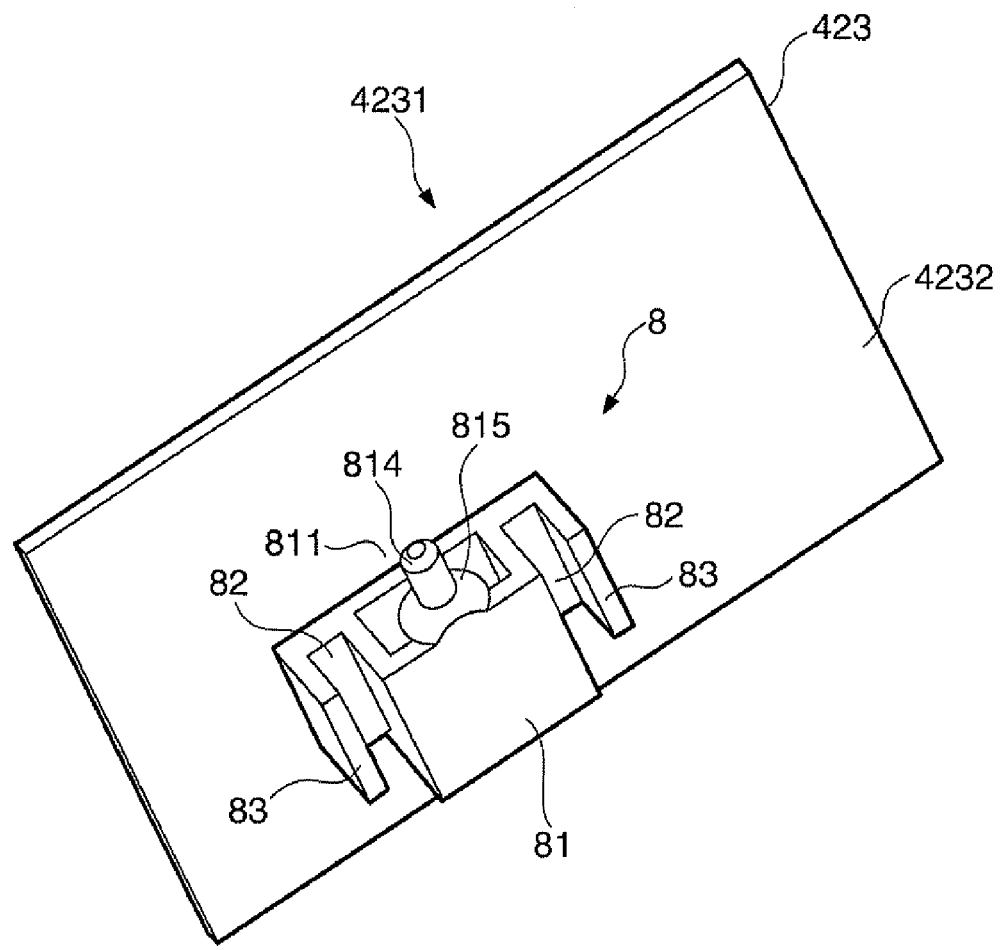
FIG. 6 is a perspective view of the reflection member as viewed from below.

FIG. 4 is a view illustrating the reflection member 423 as viewed from the above, below, side and rear (back) of the reflection member 423. FIGS. 5 and 6 are perspective views of the reflection member 423 as viewed from above and below.

As described above, the reflection member 423 is a mirror which reflects the blue light divided by the dichroic mirror 421 and guides the blue light to the converging lens 419 for blue light. As illustrated in FIGS. 4 through 6, the reflection member 423 has a substantially rectangular front portion 4231 which has a reflection area for reflecting the entering blue light on almost the entire surface of the front portion 4231, and a back portion 4232 forming the opposite side of the front portion 4231. The fixing unit 8 fixed to the attachment unit 7 is attached to the back portion 4232 by an adhesive or the like.

Structure of Fixing Unit

The fixing unit 8 is provided within the surface of the back portion 4232. Thus, the fixing unit 8 does not project to the outside of the reflection member 423 when the reflection member 423 is viewed from the front or the back. The fixing unit 8 thus designed has a main portion 81, a pair of extending portions 82 extending from the left and right ends of the main portion 81 along the back portion 4232, and a pair of engaging portions 83 extending from the projection ends of the extending portions 82 and bended substantially at right angles in directions away from the back portion 4232.

The main portion 81 has a substantially parallelepiped shape as a whole, and includes a rectangular opening 811 opening upward, and a pair of contact surfaces 812 and 813 forming the longer sides of the edge of the opening 811 and disposed opposed to each other.

The pair of the contact surfaces 812 and 813 are formed in such a manner as to extend along the back portion 4232. A jig J for adjusting the position of the reflection member 423 (see FIG. 7) contacts the pair of the contact surfaces 812 and 813. The pair of the contact surfaces 812 and 813 are provided as slopes inclined in such a manner as to come close to each other toward the tip of the opening 811 in its depth direction (the insertion direction of the jig J described later). A curved portion 8121 (see FIGS. 8 and 9) having a shape corresponding to the shape of the jig J (more specifically, an end portion J221 described later) is formed at the tip of the contact surface 812 in the depth direction on the back portion 4232 side.

A substantially cylindrical pin 814 extending downward is provided at the lower end of the main portion 81. The pin 814 is inserted through the hole 731 formed on the attachment unit 7 when the fixing unit 8 is fixed to the attachment unit 7.

A contact portion 815 contacting the support portion 73 when the pin 814 is inserted through the hole 731 is further provided on the base side of the pin 814 in its extending direction. The contact portion 815 has a curved surface expanding downward. The guiding direction of the reflection member 423 is positioned by inclination of the contact portion 815 having the curved surface along the support portion 73 with the pin 814 inserted through the hole 731. Thus, the outside diameter of the pin 814 including a clearance necessary for the position control (a clearance allowing inclination of the pin 814) is made smaller than the inside diameter of the hole 731.

The cross point of the center axis of the pin 814 and the center axis of the inclined contact portion 815 is determined in such a position as to be located substantially on a line extended from the optical axis of the light supplied to the reflection member 423 (the blue light), which will be described in detail later.

As described above, the pair of the extending portions 82 extend from the left and right ends of the main portion 81 and are fixed to the back portion 4232 by an adhesive or the like together with the main portion 81.

Each of the pair of the engaging portions 83 is inserted into a gap G between the side portion 71 and the guide portion 74 close to each other (see FIG. 3) when the fixing unit 8 is fixed to the attachment unit 7. After the position control of the reflection member 423, adhesives are injected into the gaps G such that the fixing unit 8 and thus the reflection member 423 are fixed to the attachment unit 7.

Structure of Jig

Figure 7:
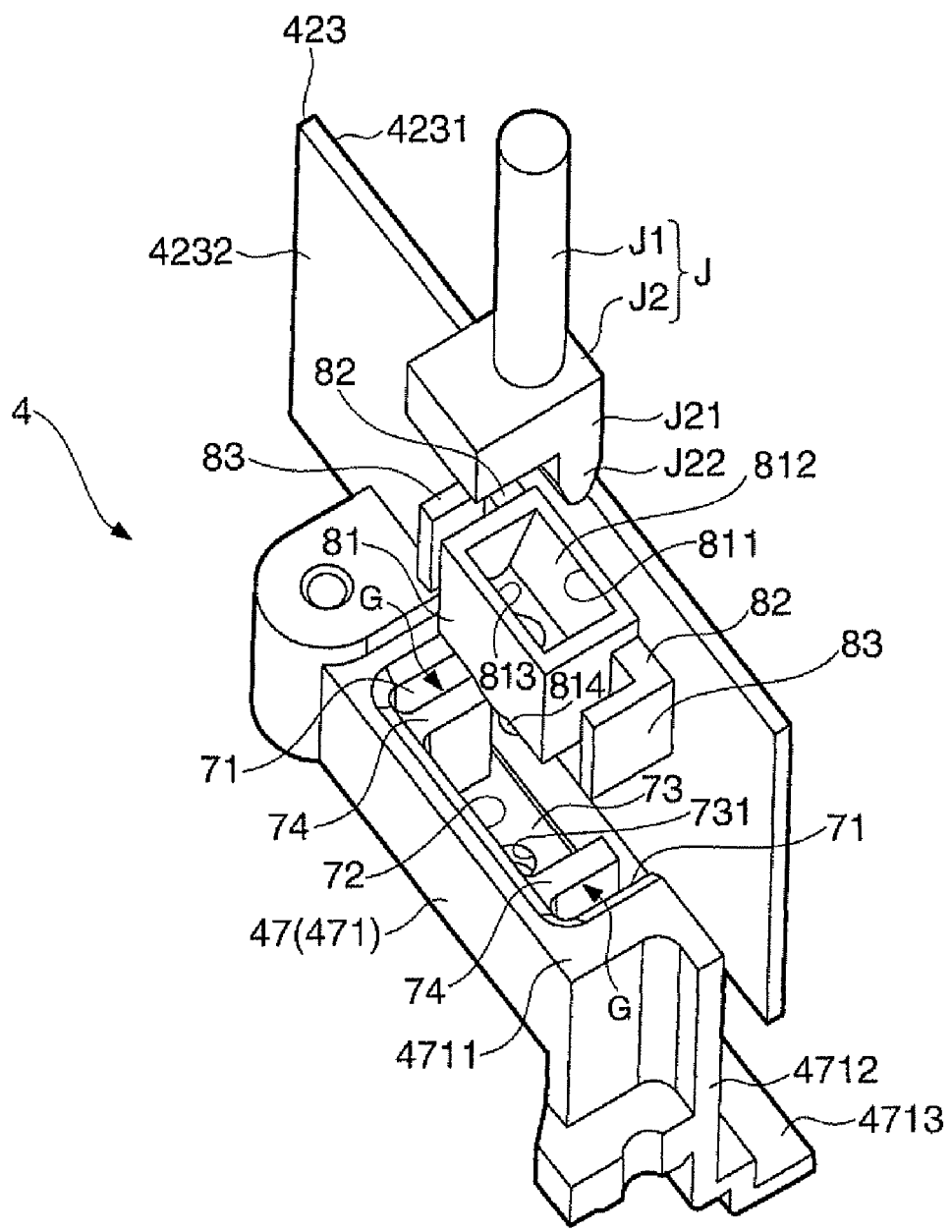
FIG. 7 is a perspective view showing the attachment unit, the reflection member, and a jig according to the embodiment.
Figure 8:
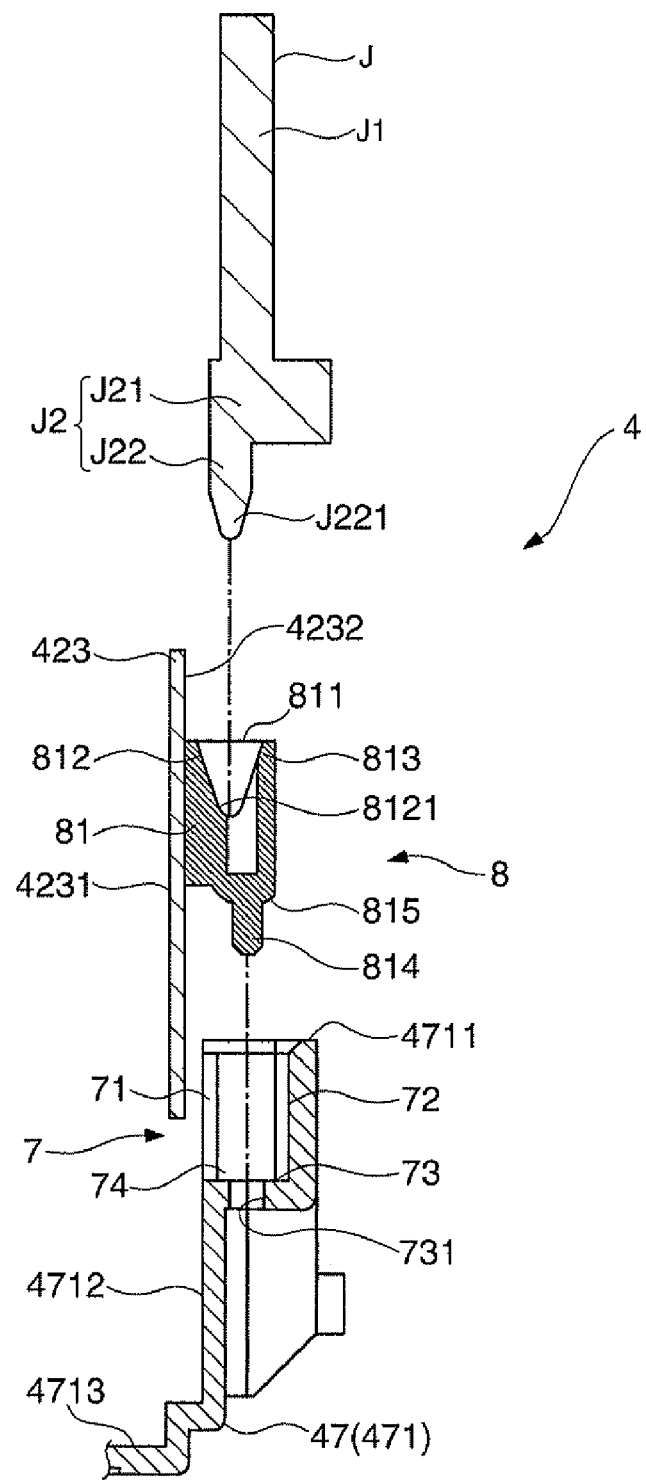
FIG. 8 is a vertical cross-sectional view showing the attachment unit, the reflection member, and the jig according to the embodiment.
Figure 9:
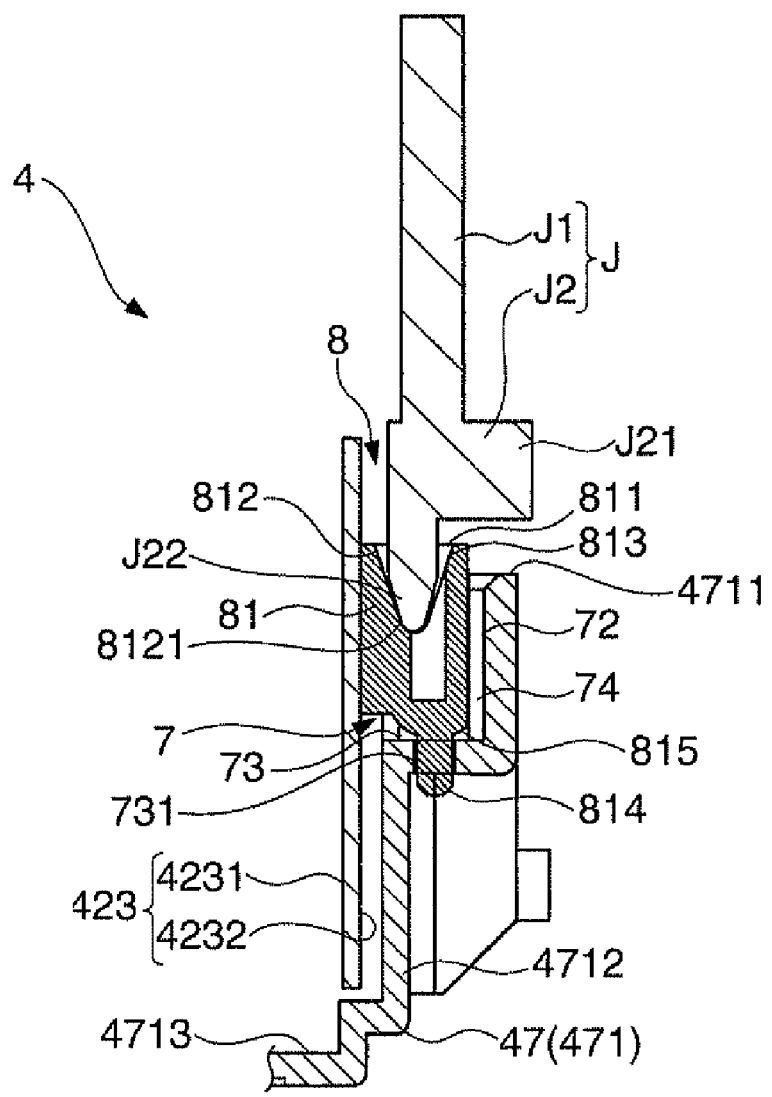
FIG. 9 is a vertical cross-sectional view showing the attachment unit, the reflection member, and the jig according to the embodiment.

FIG. 7 is a perspective view illustrating the attachment unit 7, the reflection member 423, and the jig J. FIG. 8 is a vertical cross-sectional view of these units, and FIG. 9 is a vertical cross-sectional view illustrating a combined condition of the units.

As described above, the jig J engages with the fixing unit 8 of the reflection member 423 attached to the attachment unit 7 to control the position of the reflection member 423 with respect to the entering light (the blue light). As illustrated in FIGS. 7 through 9, the jig J has a shaft portion J1 fixed to a moving device (not shown) for moving the jig J, and an engaging portion J2 provided at the tip of the shaft portion J1.

The engaging portion J2 has a substantially L shape in the side view having a size larger than the outside diameter of the shaft portion J1. The engaging portion J2 has a substantially parallelepiped base portion J21 crossing the center axis of the shaft portion J1 at right angles, and a wide projecting portion J22 extending from the lower end of the base portion J21.

The projecting portion J22 is inserted into the opening 811 formed on the main portion 81 of the fixing unit 8 to contact the contact surfaces 812 and 813 forming the edge of the opening 811. A tip J221 of the projecting portion J22 has a circular-arc shape corresponding to the shape of the curved portion 8121 such that the tip J221 can contact the curved portion 8121. Thus, the load of the jig J in its insertion direction into the opening 811 is easily transmitted to the fixing unit 8.

Position Control of Reflection Member

Figure 10:
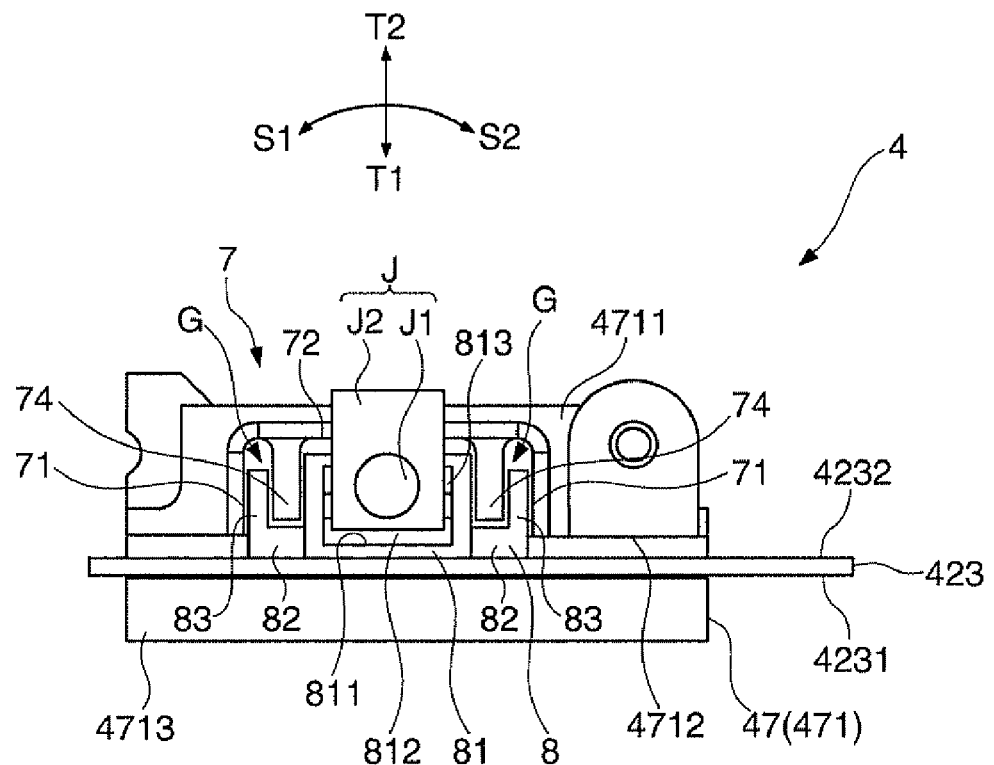
FIG. 10 is a plan view showing the attachment unit, the reflection member, and the jig according to the embodiment.

FIG. 10 is a plan view showing the combined condition of the reflection member 423, the attachment unit 7, and the jig J.

The position control of the reflection member 423 is now discussed.

As illustrated in FIGS. 9 and 10, the reflection member 423 is attached to the attachment unit 7 such that the pair of the engaging portions 83 of the fixing unit 8 provided on the reflection member 423 can be inserted into the gaps G and that the main portion 81 can be positioned between the pair of the guide portions 74. In this case, the fixing unit 8 and thus the reflection member 423 become self-supported at the attachment unit 7 by insertion of the pin 814 provided on the main portion 81 through the hole 731 formed on the support portion 73 and by contact between the contact portion 815 and the support portion 73.

When the projecting portion J22 of the jig J is inserted into the opening 811 in this condition, the projecting portion J22 contacts the pair of the contact surfaces 812 and 813. In this case, the tip J221 of the projecting portion J22 contacts these surfaces along the curved portion 8121 formed on the contact surface 812. Under this condition, the extension line from the center axis of the shaft portion J1 agrees with the extension line from the center axis of the pin 814. That is, the center axis of the pin 814 is positioned on a line extending in the insertion direction of the jig J.

In this condition, the distance between the reflection member 423 and the side wall 4712 is controlled by advancing and withdrawing the shaft portion J1 of the jig J in a T1 direction (the direction in which the reflection member 423 moves away from the side wall 4712) and a T2 direction (the direction in which the reflection member 423 approaches the side wall 4712). By this method, the position of the reflection member 423 in the direction along the optical axis of the entering light is controlled.

When the shaft portion J1 is rotated in an S1 direction (the anticlockwise direction as viewed from above) and an S2 direction (the clockwise direction as viewed from above) around the center axis of the shaft portion J1 under the above condition, the fixing unit 8 rotates in the same directions as the S1 and S2 directions accordingly. As a result, the reflection member 423 rotates in the same direction as the rotation direction of the fixing unit 8, thereby controlling the left and right inclinations of the reflection member 423 with respect to the optical axis of the entering lights.

On the other hand, when the shaft portion J1 is inclined under the above condition, the contact portion 815 swings along the support portion 73. More specifically, when the end of the shaft portion J1 on the side opposite to the engaging portion J2 side is inclined in the front-rear direction (the T1 direction and the T2 direction), the fixing unit 8 engaging with the projecting portion J22 rotates frontward and rearward around a center axis of a line extending parallel with a direction orthogonal to the inclination direction of the shaft portion J1 and the center axis of the pin 814 and passing the contact area between the support portion 73 and the contact portion 815. As a result, the reflection member 423 rotates in the same direction as the rotation direction of the fixing unit 8, thereby controlling the inclination in the vertical direction (inclination of the guiding direction) of the reflection member 423 with respect to the optical axis of the entering light.

Figure 11:
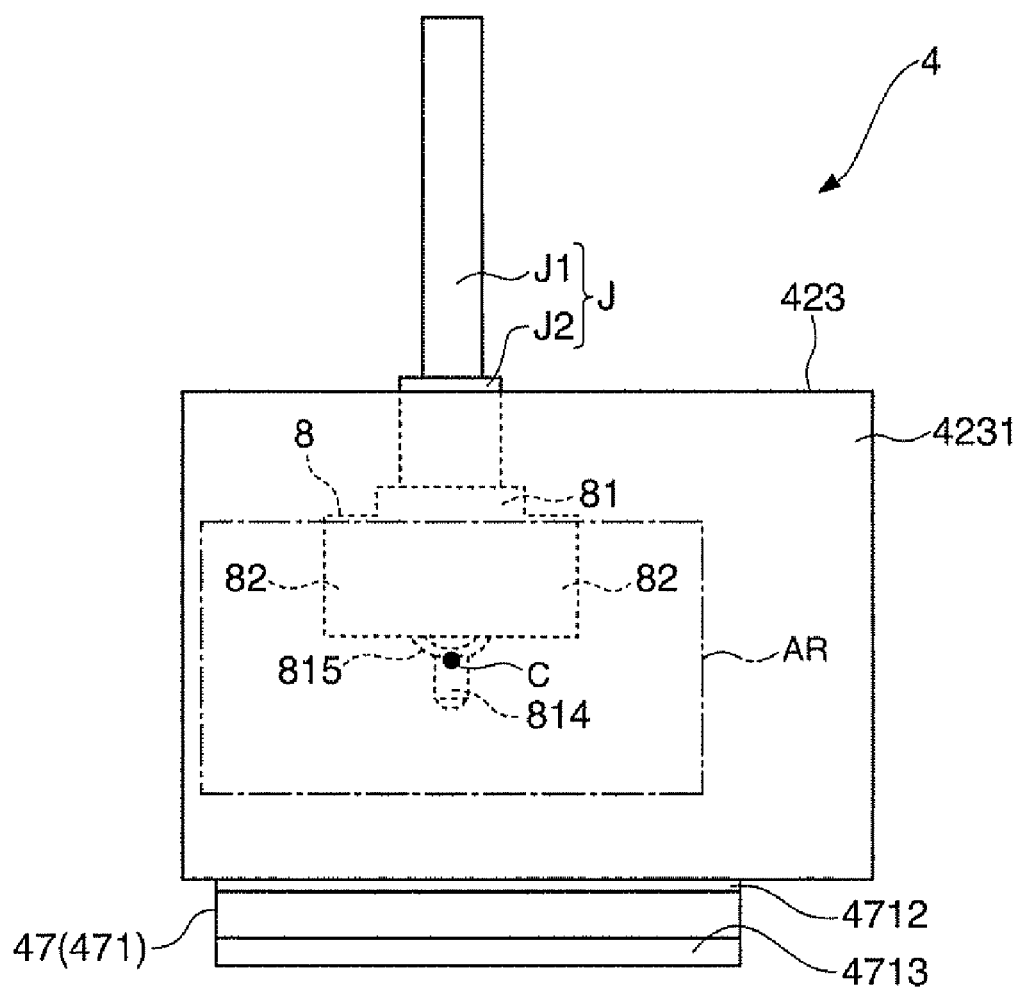
FIG. 11 shows the positional relationship between the rotation center of the reflection member and the optical axis of entering light according to the embodiment.

FIG. 11 illustrates the positional relationship between the rotation center of the reflection member 423 under the position control and the optical axis of the light supplied to the reflection member 423. FIG. 11 shows the reflection member 423 as viewed from the front (light entering side). In FIG. 11, a light receiving area AR of the reflection member 423 is indicated by a dashed line.

As illustrated in FIG. 11, a rotation center C of the reflection member 423 under the position control, that is, the rotation center C as the cross point of the center axis of the pin 814 as the rotation axis of the shaft portion J1 rotated clockwise and anticlockwise and the center axis of the inclined shaft portion J1 is positioned on an extension line from the optical axis of the light supplied to the front portion 4231. In other words, the rotation center C of the reflection member 423 passes the center of the light receiving area AR and lies on the extension line from the optical axis of the light.

According to this structure, at the time of the position control of the reflection member 423 by rotating the shaft portion J1 clockwise and anticlockwise, the displacements at the left and right ends of the light receiving area AR (i.e., both the ends in the direction orthogonal to the center axis of the pin 814 when the reflection member 423 is viewed from the light entering side) can be made substantially equal.

Similarly, at the time of the position control of the reflection member 423 by inclining the shaft portion 31 frontward and rearward (toward the base end and the leading end in the light entering direction with respect to the reflection member 423), the displacements at the upper and lower ends of the light receiving area AR (i.e., both the ends on the line extended from the center axis of the pin 814) can be made substantially equal.

The reflection member 423 positioned in this manner is fixed to the attachment unit 7 by the adhesives injected into the gaps G and hardened. Thus, the base portion 321 of the jig J is made smaller than the main portion 81 when the fixing unit 8 is viewed in the plan view so as not to prevent injection of the adhesives as illustrated in FIG. 10.

According to the projector 1 in this embodiment, the following advantages can be offered.

As illustrated in FIG. 4, the fixing unit 8 is positioned within the surface of the back portion 4232. In this case, no part projects to the outside of the reflection member 423 when the reflection member 423 is viewed from the front (light entering side). That is, the reflection member 423 attached to the component receiving member 47 does not project to the outside of the receiving opening 4711 of the component receiving member 47 (more specifically, the main section 471). Thus, the optical device 4 can be made compact.

The fixing unit 8 has the opening 811 into which the projecting portion J22 of the jig J is inserted in the attachment direction of the reflection member 423 to the attachment unit 7. In this structure, the projecting portion J22 can be easily inserted and removed into and from the fixing unit 8. Thus, the reflection member 423 and the jig J can easily engage with each other and disengage from each other, thereby facilitating the position control of the reflection member 423.

The position of the reflection member 423 can be controlled by rotating the jig J around the center axis of the pin 814 which extends in the insertion direction of the jig J into the opening 811 and is inserted through the hole 731. Since the reflection member 423 is supported by the support portion 73 via the fixing unit 8 within the attachment unit 7, the jig J is not required to hold the reflection member 423. Thus, the position of the reflection member 423 can be easily controlled, and the structure of the jig J can be simplified. Furthermore, the necessity for separately providing a member for positioning the fixing unit 8 within the attachment unit 7 is eliminated, which does not increase the number of the required components.

The contact portion 815 has the curved surface whose central portion expands toward the support portion 73, and the support portion 73 has a flat surface brought into contact with the curved surface. According to this structure, the position of the reflection member 423 can be controlled by inclining the reflection member 423 in the direction in which the curved surface follows the flat surface (the rotation direction around the center axis orthogonal to the center axis of the pin 814 as the guiding direction) with the fulcrum located at the contacting area between the curved surface and the flat surface. Since the clearance necessary for the position control is provided between the pin 814 and the edge of the hole 731, the position control of the reflection member 423 is not interrupted. Thus, the position control direction of the reflection member 423 can be further varied such that the reflection member 423 can be disposed at a more appropriate position.

The rotation center C of the reflection member 423 rotated by the jig J is located substantially on the extension line from the optical axis of the light supplied to the reflection member 423. According to this structure, the displacements at both the ends (the left and right ends and the upper and lower ends) of the light receiving area AR can be made substantially equal as explained above. Thus, the position of the reflection member 423 can be further adequately controlled. In addition, the entering blue light can be securely supplied to the image forming area of the liquid crystal panel 441B via the converging lens 419 and the entrance side polarization plate 442 by using the reflection member 423 under the position control in this manner. Thus, the efficiency of using the blue light can be improved.

The pair of the contact surfaces 812 and 813 forming the edge of the opening 811 and contacting the projecting portion J22 of the jig J are inclined surfaces inclined in the direction of approaching each other toward the end in the insertion direction of the projecting portion J22. According to this structure, the engagement between the projecting portion J22 and the contact surfaces 812 and 813 can be secured. Moreover, at the time of the position control of the reflection member 423, the load for preventing the swing of the reflection member 423 self-supported on the support portion 73 in the insertion direction of the jig J (i.e., the attachment direction of the reflection member 423 to the main section 471) can be easily given to the fixing unit 8 and thus the reflection member 423. Furthermore, the projecting portion J22 can be easily removed from the opening 811 after the position control of the reflection member 423. Thus, the position control of the reflection member 423 can be further easily performed.

Modification of Embodiment

The invention is not limited to the embodiment described and depicted herein. It is therefore intended that modifications, improvements and the like of the embodiment without departing from the scope and spirit of the invention are included in the invention.

According to this embodiment, the hole 731 through which the pin 814 is inserted is formed on the support portion 73 for supporting the contact portion 815 provided at the base end of the pin 814. However, the contact portion may be disposed not at the base end of the pin 814 but at the lower parts of the extending portions 82, and the support portion may be provided at a position corresponding to the contact portion, for example.

According to this embodiment, the surface of the contact portion 815 opposed to the support portion 73 is a curved surface, and the surface of the support portion 73 opposed to the contact portion 815 is a flat surface. However, the surface of the support portion 73 opposed to the contact portion 815 may be a curved surface, and the surface of the contact portion 815 opposed to the support portion 73 may be a flat surface.

According to this embodiment, the pin 814 has a substantially cylindrical shape. However, when the position control of the reflection member by rotation around the center axis of the pin is unnecessary, the pin may have a prismatic shape. In this case, the hole into which the pin is inserted is formed in a shape corresponding to the shape of the pin. In case of the prismatic pin, the position control of the reflection member can be performed by rotation around the center axis of the pin as the rotation axis when the inside diameter of the hole 731 is sufficiently larger than the outside diameter of the pin.

According to this embodiment, the pair of the contact surfaces 812 and 813 engaging with the projecting portion J22 of the jig J are inclined surfaces approaching each other toward the end in the insertion direction of the projecting portion J22. However, only one of the pair of the contact surfaces may be an inclined surface approaching the other surface toward the end in the insertion direction of the projecting portion J22. The pair of the contact surfaces are not required to be inclined but may be substantially parallel surfaces extending in the insertion direction of the projecting portion J22. That is, the shapes of the contact surfaces may be any shapes as long as the projecting portion J22 can engage with the inside of the opening 811.

According to this embodiment, the projector 1 has the three liquid crystal panels 441. However, the invention is applicable to a projector including two or a smaller number of liquid crystal panels, or four or a larger number of liquid crystal panels.

While the optical device 4 has a substantially L shape in the plan view in this embodiment, the optical device 4 may have other shapes. For example, an optical device having a substantially U shape in the plan view may be employed.

While the transmission type liquid crystal panels 441 each of which has the separate light entrance surface and light exit surface are used in this embodiment, reflection type liquid crystal panels each of which has one surface functioning as both the light entrance surface and the light exit surface may be used.

According to this embodiment, the projector 1 having the liquid crystal panels 441 as the light modulation devices has been discussed. However, light modulation devices having different structure may be employed as long as they can modulate entering light according to image information to form optical images. For example, the invention is applicable to a projector including light modulation devices other than liquid crystal devices such as devices using micromirrors. When these light modulation devices are used, the light entrance side and light exit side polarization plates 442 and 443 can be eliminated.

While the projector 1 including the optical device according to the invention has been discussed, the invention is applicable to an optical device included in an image capture device such as a camera, or an illumination device.

The invention can be applied to an optical device, and particularly to an optical device included in a projector as a preferable application.

What is claimed is:

1. An optical device comprising:
   a housing; and
   a reflection member disposed at a predetermined position within the housing, the housing including:
   a receiving opening through which the reflection member is inserted to be accommodated in the housing, and
   an attachment unit to which the reflection member is attached, the reflection member including:
   a front portion having a reflection area for reflecting supplied light,
   a back portion positioned on a side opposite to the front portion, and
   a fixing unit attached to the back portion and positioned within a surface of the back portion, the fixing unit being configured to be fixed to the attachment unit, and
   the fixing unit having an opening, the opening being configured to detachably accept a position control jig that is inserted into the opening in an attachment direction that is parallel to a direction in which the reflection member is inserted into the receiving opening,
   wherein:
   the fixing unit includes:
   a substantially cylindrical pin extending in the attachment direction, and
   a contact portion contacting the attachment unit; and
   the attachment unit includes:
   a hole through which the pin is inserted, and
   a support portion which contacts the contact portion and supports the fixing unit,
   wherein:
   one of the contact portion and the support portion has a curved surface centered on a line extending in a direction of inserting the pin through the hole and expanding toward the other of the contact portion and the support portion;
   the other of the contact portion and the support portion has a flat surface substantially orthogonal to the attachment direction; and
   a predetermined clearance allowing rotation of the reflection member with a fulcrum of the rotation of the reflection member located at a contacting area between the curved surface and the flat surface is provided between an edge of the hole and the pin inserted through the hole.

2. The optical device according to claim 1, wherein:
   the contact portion is formed at the base end of the pin; and
   the cross point of the center axis of the pin and the center axis of the reflection member inclined with the fulcrum of the inclination of the reflection member located at the contacting area is positioned almost on an extension line from the optical axis of the light supplied to the reflection member when the reflection member is accommodated in the housing.

3. The optical device according to claim 1, wherein:
   the fixing unit contains a pair of contact surfaces each of which forms an edge of the opening and contacts the jig; and
   one of the contact surfaces is an inclined surface approaching the other of the pair of contact surfaces in the insertion attachment direction.

4. A projector comprising:
   the optical device according to claim 1.

* * * * *